United States Patent

[11] 3,627,597

[72] Inventor Nathan A. Tiner
1017 Skyline Drive, Laguna Beach, Calif. 92651
[21] Appl. No. 834
[22] Filed Jan. 5, 1970
[45] Patented Dec. 14, 1971

[54] ENGRAVING
9 Claims, No Drawings

[52] U.S. Cl. .......................................................... 156/13,
117/93.31, 204/143 R, 204/157.1 H, 204/158 HE
[51] Int. Cl. .......................................................... C23f 1/00,
B23p 1/00
[50] Field of Search ............................................ 156/13;
204/143 R, 157.1 H, 158 HE; 117/93.31

[56] References Cited

UNITED STATES PATENTS 3,258,898 7/1966 Garibotti ...................... 29/155.5

OTHER REFERENCES

Halpin et al.– Laser Machining Using Nylon– Epoxy Mask. IBM Technical Disclosure Bulletin, Vol. 10, No. 11, Apr. 1968, p. 1651

Pirog, IBM Technical Disclosure Bulletin, Vol. 12, No. 1, June 1969, p. 160, Thermally Depolymerizable Photoresists Organic Coatings, Roberts, Dept. of Com. Nat' l. Bureau of Standards Building Science Series 7, Feb. 1968, U.S. Gov' t. Prtg. Office pp. 88 & 89

*Primary Examiner*—Jacob H. Steinberg
*Attorney*—Nienow and Frater

ABSTRACT: The method of engraving in which a metal surface is coated with a film of an etchant resistant material that will adhere to the metal and which is decomposed upon irradiation by subatomic particles such for example as a fluorocarboxylic acid such as perfluorooctanic acid. Thereafter the resistant material is irradiated over those areas of the metal that are to be etched. The decomposed, irradiated film is rinsed away and the exposed metal is engraved with an etchant.

ENGRAVING

This invention relates to improved methods of engraving metal surfaces and one of its objects is to provide a novel and advantageous method of engraving.

While not limited to the creation of precision micropatterns, the invention is particularly well suited to that purpose and the production of very small engraved patterns, many thousands of times smaller than has heretofore been possible, is another object of the invention. A related object is to provide an engraving method in which the pattern is traced by a beam of subatomic particles.

Photoengraving processes are capable of producing relatively small patterns but the lower limit is determined by the grain size in the photosensitive materials. Currently employed materials have grain sizes in the 0.1 micron range and may have grains as large as 0.5 microns heterogeneously distributed through the material. The invention makes it possible to produce etchings whose lines and line spacings are several orders of magnitude smaller than has been possible with photoengraving processes. One of its objects is to provide a means for producing engravings in thin films with line widths and spacings in the micron and submicron ranges.

The process of the invention permits production of electronic circuit boards with circuit run densities far greater than has heretofore been possible and it is well suited to microcircuitry production and to production of high density computer memory devices and computer printers and readers. The provision of a method suitable to these purposes is another object of the invention.

Certain of these and other objects and advantages of the invention are realized by applying a film to the metal surface to be engraved composed of molecules which adhere to the surface, which resists the action of an etchant, and which is decomposed upon being bombarded by subatomic particles. In a preferred form of the invention the film comprises a structureless arrangement of polymer molecules. This feature is not essential but is preferred because it permits miniaturization in greater degree. Irradiation by high velocity subatomic particles results in chain scission and chain stripping of the molecules to the end that the film is decomposed over the irradiated areas. The decomposed film is removed to expose the metal surface. An etchant applied to the metal will etch the exposed surfaces but the surfaces on which the film is intact will not be attacked.

The requirement that the thin film be one that resists etchants is met by a number of materials including fluorocarbons and acrylic polymers. Some of the fluorocarbon polymers are resistant to the strongest acids and they are preferred. It is important that the film be solid and acid resistant in sufficient degree to limit etching by solutions that will etch the irradiated areas of the film.

The requirement that the thin film adhere to the surface can be met by chemical bonding when polymers including carboxylic acid groups are applied to the metal surface. Other materials meet the requirement but a carboxylic acid applied in a monolayer, or a very few layers, forms a metal soap that adheres tenaciously to metal surfaces and is the preferred material. When irradiated with alpha or beta particles the metal bond is broken with the liberation of $CO_2$ gas. Also, some molecules are divided by irradiation by scission. The residue of this decomposition rinses away with water and other common solvents. Thus, the invention permits etching on a scale measured by the dimensions of molecules rather than by the dimensions of grains.

Fluorocarbon polymers being preferred for their resistant and protective qualities and carboxylic groups for their chemisorptive qualities, the preferred material for preparation of the metal surface is a perfluorocarboxylic acid such for example as perfluorooctanic acid. In special circumstances a polyacrylic acid can be employed.

The etchant resistant film is applied in any convenient fashion. However, in the preferred method the resistant material is dissolved in an easily evaporated solvent. The surface to be coated is dipped into the solution or sprayed with it. The solvent is then dried away. To insure deposition of uniform films, it is preferred that only small quantities of resistant material be dissolved in large quantities of solvent and the film is applied in several steps. Film thickness of 0.1 micron or less are preferred. When the resistant film is a fluorocarboxylic acid, the solvents water and methanol are preferred although other materials might be selected in view of subsequent processes to which the product may be subjected.

The method is not limited to electron irradiation but electron irradiation is relatively convenient and it is effective. The film over the areas of the metal surface that are to be etched is simply placed in the path of an electron beam. Areas that are not to be exposed can be protected by metal masks. The exposure can be accomplished by projecting a parallel electron beam through a thin master metal mask, superposed to the film, or projecting a reduced image of the mask onto the film by means of an electron optic system. Alternatively the pattern can be traced by automatically controlling the scanning motion of the electron beam in the same way that this is accomplished in a scanning electron microscope. The electrons can be projected in the form of a beam which is moved over said surface a distance corresponding to a fraction of the pattern to be reproduced in miniature. Combinations of the methods are advantageously employed when the pattern to be etched includes portions of widely differing area.

In one specific example of the invention a glass substrate was cleaned with acetone, rinsed with water and dried in a vacuum. Using vacuum deposition, an aluminum film was formed on the substrate to a thickness of about 1,000 A. A 2 percent acid, 2 percent water methanol solution was prepared with perfluorooctanic acid. That acid has the formula: $CF_3(CF_2)COOH$. The aluminum-glass substrate was dipped into the solution and dried in air. That was repeated twice. Thereafter the substrate was dipped in a solution consisting of 4 percent of the acid in methanol for one-half hour. It was then removed, drained and dried in air. Thereafter a copper electron microscope grid was placed upon the fluorocarbon film and the grid and substrate were placed in the high resolution diffraction stage of an electron microscope and exposed to a beam of electrons accelerated by 20 Kilovolts for a few minutes. The film that was exposed to he beam had decomposed and was rinsed away by a mixture of ethanol and water. Thereafter the aluminum at the irradiated areas was etched away by immersing the substrate in a solution of 5 percent hydrofluoric acid in water. Examination of the result at 2,000 magnification verified that the edge acuity and details in line periphery of the copper grid had been reproduced with extremely high accuracy.

Although I have shown and described certain specific embodiments of my invention, I am fully aware that many modifications thereof are possible. My invention, therefore, is not to be restricted except insofar as is necessitated by the prior art.

I claim:

1. The method of engraving metal surfaces comprising the steps of applying a fluorocarbon compound including a carboxylic acid group to the metal surface to be engraved to form a film;

irradiating selected areas of the metal surface with high velocity subatomic particles; and etching said selected areas.

2. The method of engraving metal surfaces which comprises applying a radiation sensitive polymer with a carboxylic acid group to the surface to be engraved to form a film;

thereafter exposing selected areas of said surface to irradiation by subatomic particles to decompose the film;

removing the decomposed portions of the film; and subjecting the surface to an etchant whose action is resisted by unexposed areas of said film.

3. The invention defined in claim 2 in which the polymer includes fluorocarbon.

4. The invention defined in claim 2 in which said polymer comprises a polyacrylic acid.

5. The invention defined in claim 3 in which said etchant includes a hydrofluoric acid solution.

6. The invention defined in claim 2 in which the polymer is a perfluorocarboxylic acid.

7. The invention defined in claim 6 in which the perfluorocarboxylic acid is perfluorooctanic acid.

8. The invention defined in claim 7 in which the perfluorooctanic acid comprises part of an aqueous solution, in which the solution is applied to the surface to be etched and air dried to a solid film and in which the film is irradiated with an electron beam.

9. The method of engraving metal surfaces which comprises the steps of:

applying a fluorocarbon compound to the metal surface to be engraved to form a film;

irradiating selected areas of the metal surface with high velocity subatomic particles; and etching said selected areas;

the irradiation being accomplished with electrons projected in the form of a beam which is moved over said surface a distance corresponding to a fraction of a pattern to be reproduced in miniature.

* * * * *